(12) United States Patent
Xiong et al.

(10) Patent No.: US 10,574,793 B2
(45) Date of Patent: Feb. 25, 2020

(54) METHOD, APPARATUS AND TERMINAL DEVICE FOR COMMUNICATION PROTOCOL COMPATIBILITY

(71) Applicant: UBTECH Robotics Corp, Shenzhen (CN)

(72) Inventors: Youjun Xiong, Shenzhen (CN); Haiwu Su, Shenzhen (CN); Lin Chen, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 154 days.

(21) Appl. No.: 15/891,380

(22) Filed: Feb. 8, 2018

(65) Prior Publication Data

US 2019/0199834 A1  Jun. 27, 2019

(30) Foreign Application Priority Data

Dec. 27, 2017 (CN) .......................... 2017 1 1444553

(51) Int. Cl.
*H04L 29/06* (2006.01)
(52) U.S. Cl.
CPC .............. *H04L 69/08* (2013.01); *H04L 69/18* (2013.01); *H04L 69/24* (2013.01)
(58) Field of Classification Search
None
See application file for complete search history.

(56) References Cited

U.S. PATENT DOCUMENTS

| | | | | |
|---|---|---|---|---|
| 2006/0225069 A1* | 10/2006 | Yuuki | ....................... | G06F 8/65 717/170 |
| 2007/0271387 A1* | 11/2007 | Lydon | ................... | G06F 1/3209 709/230 |
| 2014/0304498 A1* | 10/2014 | Gonuguntla | ......... | H04L 63/168 713/151 |
| 2015/0319218 A1* | 11/2015 | Sprigg | ...................... | G06F 8/60 717/171 |
| 2016/0255143 A1* | 9/2016 | Hunt | ..................... | H04L 67/104 709/226 |
| 2018/0241841 A1* | 8/2018 | Okuyama | ............... | H04L 69/24 |

* cited by examiner

*Primary Examiner* — Rebecca E Song

(57) ABSTRACT

The present disclosure provides a method, an apparatus and a terminal device for communication protocol compatibility. The method includes: receiving an external protocol list transmitted by an external device and retrieving a locally stored local protocol list; taking one of a same version information of the external protocol list and the local protocol list as matched version information, if the external protocol list and the local protocol list have the same version information; and taking the local protocol corresponding to the snatched version information as the protocol for communicating with the external device, and transmitting the matched version information to the external device. As a result, when the terminal device and the external device have the same communication protocol, they can perform data exchange using the same communication protocol automatically, which reduces the possibility of the incompatibility in the communication protocol so as to improve the communication success rate.

20 Claims, 6 Drawing Sheets

METHOD, APPARATUS AND TERMINAL DEVICE FOR COMMUNICATION PROTOCOL COMPATIBILITY

CROSS REFERENCE TO RELATED APPLICATIONS

This application claims priority to Chinese Patent Application No. 201711444553.6, filed Dec. 27, 2017, which is hereby incorporated by reference herein as if set forth in its entirety.

BACKGROUND

1. Technical Field

The present disclosure relates to communication technology, and particularly to a method, apparatus and terminal device for communication protocol compatibility.

2. Description of Related Art

In real life, in order to realize more powerful functions, an intelligent terminal device often needs to communicate with an external device such as a server, a controller or other intelligent terminal device to receive and transmit service data. Therefore, whether the communication protocol between the intelligent terminal device and the external device is the consistent or not directly affects whether the two parties can realize the exchange of the service data.

Generally, since some underlying communication protocols between the intelligent terminal and the external device are consistent, they can transmit some basic data such as handshake requests. However, the communication protocols used to transmit or parse advanced services between the intelligent terminal and the external device may become inconsistencies due to the upgrade of the protocols, which may lead to the incompatibility between the intelligent terminal and the external device, and may further lead to the problem that some service data cannot be exchanged normally.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following description, for the purpose of explanation instead of limitation, specific details such as particular system architectures, techniques, etc. are set forth so as to understand the embodiments of the present disclosure thoroughly. However, it will be apparent to those skilled in the art that the present disclosure may be implemented in other embodiments without these specific details. In other instances, detailed descriptions of well-known systems, devices, circuits, and methods are omitted so as to avoid unnecessary details to obscure the description of the present disclosure.

For the purpose of illustrating the technical scheme of the present disclosure, the following describes the specific embodiments.

Figure 1:
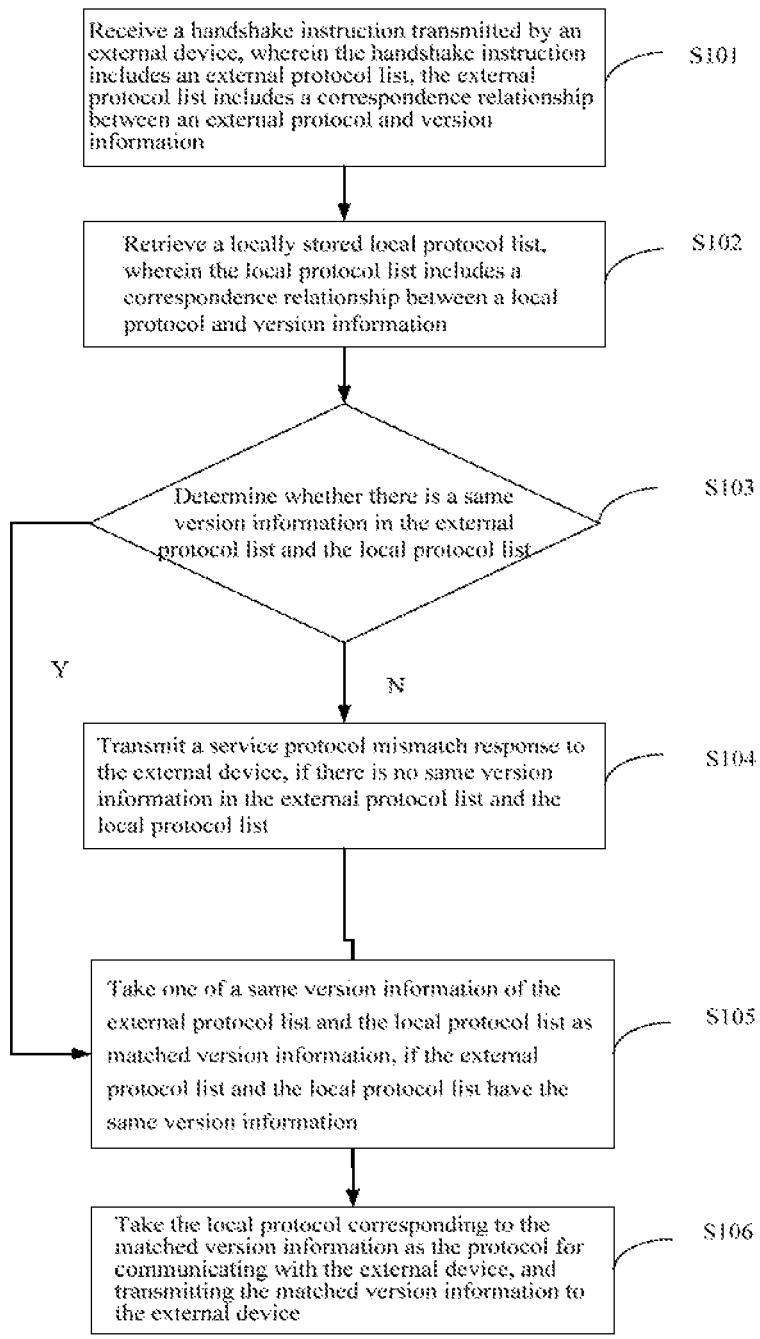
FIG. 1 is a flow chart of a communication protocol compatibility method according to an embodiment of the present disclosure.

FIG. 1 is a flow chart of a communication protocol compatibility method according to an embodiment of the present disclosure, which includes steps S101-S106. In this embodiment, the method is a computer-implemented method executable for a processor. As shown in FIG. 1, the method includes the following steps.

S101: receiving a handshake instruction transmitted by an external device, wherein the handshake instruction includes an eternal protocol list, the external protocol list includes a correspondence relationship between an external protocol and version information.

In this embodiment, the ultimate goal is to establish a communication connection between an intelligent terminal device and an external device, and further implement the exchange of service data. Therefore, basing on the underlying protocols, the external device may transmit a handshake instruction to the intelligent terminal device. The handshake instruction includes an external protocol list. Notably, the external protocol list includes the protocols supported by the external device. The protocols supported by the external device do not include the underlying protocols common to all communication devices such as the TCP/IP protocol. In this embodiment, the protocols in the external protocol list which the external device supports are referred to as external protocols. Understandably, similar to a local protocol list, since the local protocol list includes a correspondence relationship between the local protocol and version information (of the local protocol), the external protocol list also includes a correspondence relationship between the external protocol and version information (of the external protocol).

S102: retrieving a locally stored local protocol list, wherein the local protocol list includes a correspondence relationship between a local protocol and version information.

In this embodiment, the intelligent terminal device stores the local protocol list locally, in which the local protocol list stores all the protocols that have been downloaded and the version information corresponding to the protocols. Understandably, since the intelligent terminal device is upgraded periodically, the communication protocol of the intelligent terminal device may also be updated while upgrading.

Optionally, the version information may be a version number such as 0001, 0002 and 0003, and each version number corresponds to a protocol which enables the intelligent terminal device to receive and parse the service data transmitted by the external device. The processing result of the service data may be transmitted to the external device.

Notably, when the intelligent terminal device performs communication connection with the external device, there are some underlying communication protocols such as TCP/IP protocol. These underlying communication protocols ensure that the intelligent terminal device and the external device to perform basic communication functions such as handshake connection. One characteristic of these underlying communication protocols is that they do not change with the upgrade of the operating system of the intelligent terminal device, since these underlying communication protocols are some long-term communication protocols of the corresponding technical field. However, the underlying communication protocol can only ensure that the intelligent terminal device and the external device to perform basic communication functions, but cannot ensure that the intelligent terminal device and the external device to perform the exchange and the parsing of all the service data.

Exemplarily, neither an intelligent terminal device A nor an external device B originally has the function of voice collection and recognition. However, assuming that the external device B has the function of voice collection and recognition after upgrading. From the perspective of communication, the communication protocol of the external device B is updated at this moment, and the external device B has the functions of transmitting, receiving and recognizing voices. If a piece of voice to be collected by the external device B is transmitted to the intelligent terminal device A to request the intelligent terminal A to process the voice, the intelligent terminal device A cannot parse the voice even if a relevant voice recognition software is installed since the protocol in the intelligent terminal A cannot extract the voice data from the voice transmitted by the external device B, and there is no voice data for the internal voice recognition software to process. Similarly, even if the intelligent terminal A collects a piece of voice, since the protocol in the intelligent terminal A cannot package the collected voice or the packaged data cannot be parsed in the external device B, the voice collected by the intelligent terminal A cannot be processed by the external device B, too.

In this embodiment, the local protocol stored in the local protocol list does not include the underlying protocols common to all communication devices such as the TCP/IP protocol.

In this embodiment, the protocol supported by the intelligent terminal device may be parsed out by invoking the locally stored local protocol list so as to provide a data support for subsequent selecting a suitable local protocol.

Figure 2:
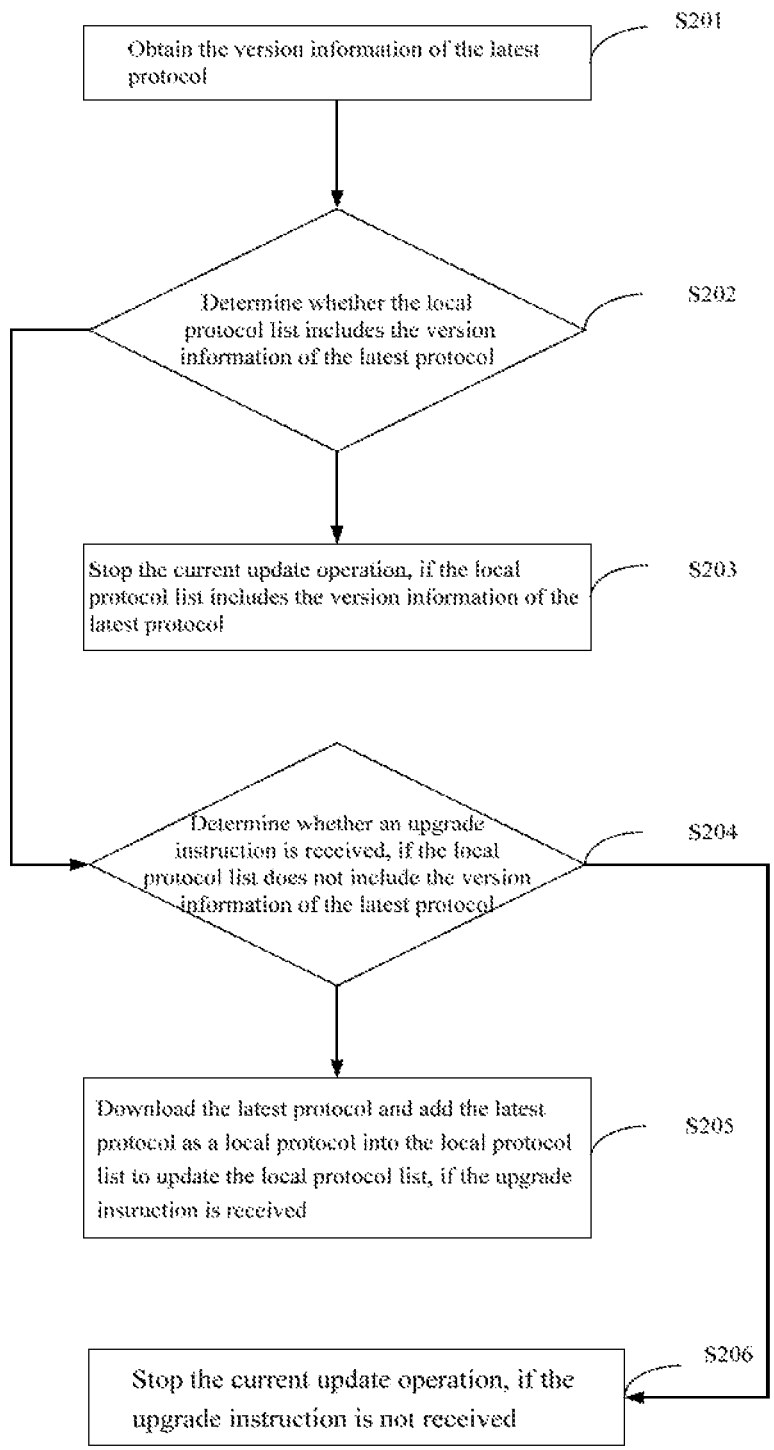
FIG. 2 is a flow chart of the updating of a local protocol list according to an embodiment of the present disclosure.

As described in the above-mentioned embodiment, the local protocol in the intelligent terminal may be updated, which also represents that the local protocol list of one intelligent terminal may also be updated. FIG. 2 is a flow chart of the updating of a local protocol list according to an embodiment of the present disclosure. As shown in FIG. 2, the method includes the following steps.

S201: obtaining the version information of the latest protocol.

Optionally, in this embodiment, the intelligent terminal device may obtain the version information of the latest protocol from a server of a network.

Optionally, the version information of the latest protocol may be identified by the time that the version information generates. Specifically, the version information with the latest generation time is used as the version information of the latest protocol.

Optionally, the version information of the latest protocol may be identified by the magnitude of the version number in the version information. Specifically, the version information with the greatest version number is used as the version information of the latest protocol.

Optionally, the version information of the latest protocol may also be directly obtained by receiving the latest version of protocol information lists (e.g., the local protocol list) pushed by the server.

S202: determining whether the local protocol list includes the version information of the latest protocol.

As described in the above-mentioned embodiment, the local protocol list includes the correspondence relationship between the local protocol and the version information. Therefore, the version information of the latest protocol may be directly searched from the local protocol list so as to complete the determination step.

S203: stopping the current update operation, if the local protocol list includes the version information of the latest protocol Understandably, if the local protocol list includes the version information of the latest protocol, it means that there is no protocol available for updating. Therefore, in this embodiment, subsequent determinations and execution steps are stopped.

S204: determining whether an upgrade instruction is received, if the local protocol list does not include the version information of the latest protocol.

Optionally, in the embodiment, there is a protocol management module for determining whether the upgrade instruction is received inside the intelligent terminal device.

Optionally, the protocol management module may determine whether the upgrade instruction is received according to the user's selection. If the selection of the user which is to upgrade the local protocol is detected, it is determined that the upgrade instruction is received. In addition the protocol management module may also determine whether the upgrade instruction is received basing on whether the time difference of the current time and the last upgrade time is greater than a preset time threshold. If the time difference between the current time and the last upgrade time is greater than the preset time threshold, it is determined that the upgrade instruction is received.

S205: downloading the latest protocol and adding the latest protocol into the local protocol list to update the local protocol list, if the upgrade instruction is received.

Notably, in this embodiment, when adding the latest protocol as a local protocol into the local protocol list, it should also be noted that the version information of the latest protocol should be corresponded to the latest protocol and to store the both in the local protocol list, and then the local protocol list includes the correspondence relationship between the latest protocol and the version information (of the latest protocol).

S206: stopping the current update operation, if the upgrade instruction is not received.

In this embodiment, the update of the local protocol is performed by determining whether the local protocol list includes the version information of the latest protocol and determining whether the upgrade instruction is received, so that the updated local protocol list includes the latest protocol, which facilitates the execution of the subsequent protocol matching steps.

S103: determining whether there is a same version information in the external protocol list and the local protocol list.

Optionally, the version information to be searched is selected from the local protocol list in the order from the latest version information to the oldest version information, and the external protocol list is traversed to determine whether the version information to be searched is in the external protocol list Optionally, if the version information to be searched is in the external protocol list, the version information to be searched is taken as the same version information of the external protocol list and the local protocol list.

Specifically, in this embodiment, the latest version information in the local protocol list is taken as the version information to be searched firstly, and then the version information to be searched is searched in the external protocol list. If it is succeed in searching the version information to be searched in the external protocol list, the version information to be searched is taken as the same version information of the external protocol list and the local protocol list; if it is fail in searching the version information to be searched in the external protocol list, the second latest version information in the local protocol list is taken as the version information to be searched, and so on. The above-mentioned steps are repeatedly performed until the same version information of the external protocol list and the local protocol list is found. Otherwise, if all the version information in the local protocol list have been searched and it is fail in searching the same version information in the external protocol list, the determination step is stopped.

S104: transmitting a service protocol mismatch response to the external device, if there is no same version information in the external protocol list and the local protocol list.

In this embodiment, the service protocol mismatch response is used to notify the external device that the related service data cannot be received, transmitted or parsed.

S105: taking one of a same version information of the external protocol list and the local protocol list as matched version information, if the external protocol list and the local protocol list have the same (i.e., matched) version information Optionally, the taking one of a same version information of the external protocol list and the local protocol list as matched version information includes taking the latest one of the same version information as the matched version information.

In this embodiment, if there is a plurality of same version information in the external protocol list and the local protocol list, the latest version information of the plurality of same version information is taken as the matched version information to configure the communication protocol of the intelligence terminal device and the external device.

S106: taking (i.e., setting) the local protocol corresponding to the matched version information as the protocol for communicating with the external device, and transmitting the matched version information to the external device.

In this embodiment, retrieving a locally stored local protocol list and receiving an external protocol list transmitted by an external device; taking the latest one of a same version information of the external protocol list and the local protocol list as matched version information, if the external protocol list and the local protocol list have the same version information; and taking the local protocol corresponding to the matched version information as the protocol for communicating with the external device, and feeding back the matched version information to the external device. As a result, when the terminal device and the external device have the same communication protocol, they can perform data exchange using the same communication protocol automatically, which reduces the possibility of the incompatibility in the communication protocol so as to improve the communication success rate.

Figure 3:
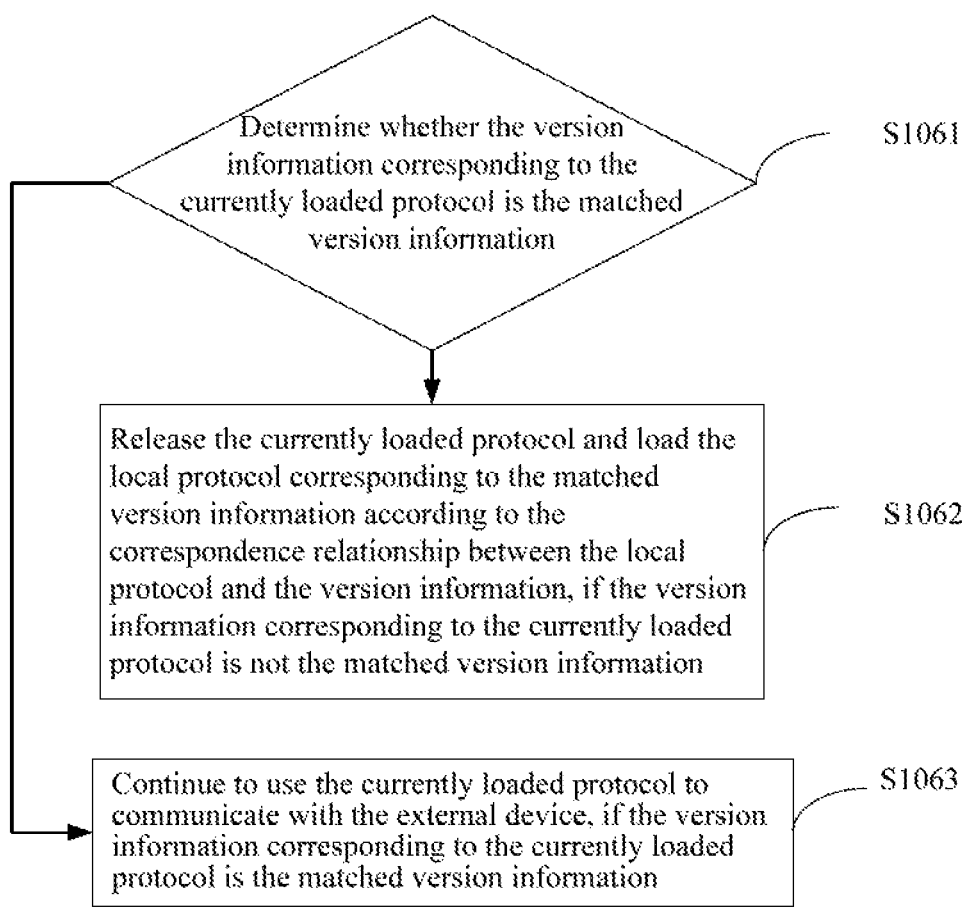
FIG. 3 is a flow chart of the details of step S106 of a communication protocol compatibility method according to an embodiment of the present disclosure.

FIG. 3 is a flow chart of the details of step S106 of a communication protocol compatibility method according to an embodiment of the present disclosure. As shown in FIG. 3, the method includes the following steps.

S1061: determining whether the version information corresponding to the currently loaded protocol is the matched version information.

In this embodiment, the intelligent terminal device will load a protocol in order to exchange service data with exteriors. A currently used protocol is referred to as a currently loaded protocol in this embodiment. In this step, it is required to determine whether the version information corresponding to the currently loaded protocol is the matched version information obtained in the above-mentioned embodiment.

S1062: releasing the currently loaded protocol and loading the local protocol corresponding to the matched version information according to the correspondence relationship between the local protocol and the version information of the local protocol, if the version information of the local protocol corresponding to the currently loaded protocol is not the matched version information.

S1063: continuing to use the currently loaded protocol to communicate with the external device, if the version information corresponding to the currently loaded protocol is the matched version information.

In this embodiment, the switching of the local protocol is implemented by comparing the version information corresponding to the currently loaded protocol and the matched version information, so that the intelligent terminal can exchange service data with the external device.

Figure 4:
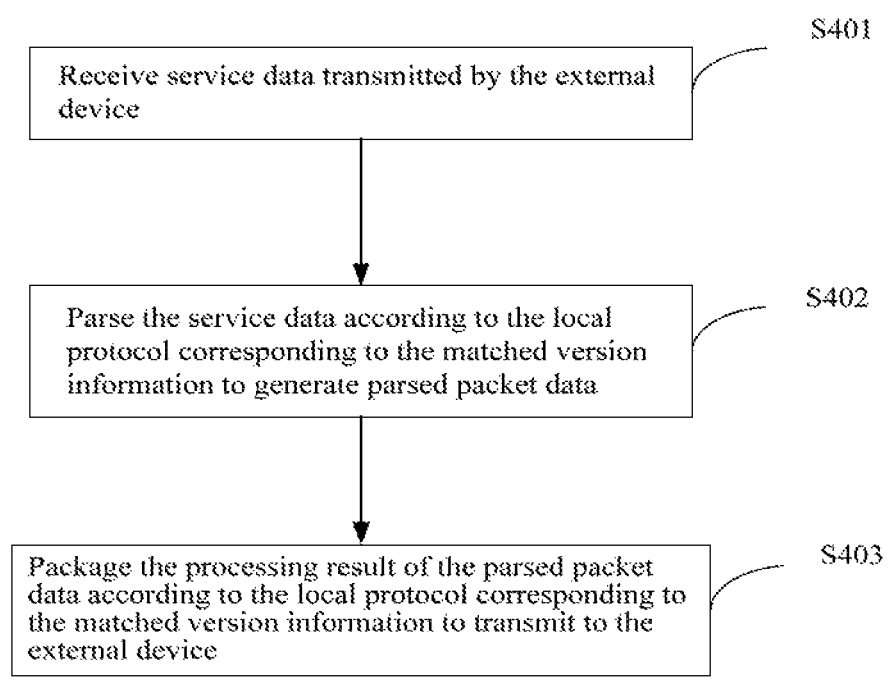
FIG. 4 is a flow chart of the reception and transmission of service data according to an embodiment of the present disclosure.

FIG. 4 is a flow chart of the reception and transmission of service data according to an embodiment of the present disclosure. As shown in FIG. 4, after the communication protocol between the intelligent terminal and the external device is compatible, the transmission and the reception of service data includes the following steps.

S401: receiving service data transmitted by the external device.

In this embodiment, both the intelligent terminal device and the external device have already performed corresponding protocol configurations according to the matched version information determined in the above-mentioned embodiment. In which, the intelligent terminal device switches the local protocol to the local protocol corresponding to the matched version information according to the local protocol list, and the external device switches the external protocol to the external protocol corresponding to the matched version information according to the external protocol list, hence the intelligent terminal device can successfully receive the service data transmitted by the external device.

S402: parsing the service data according to the local protocol corresponding to the matched version information to generate parsed packet data.

Understandably, after receiving the service data, the intelligent terminal device needs to parse the service data according to the local protocol, and extract the content included in the service data to generate parsed packet data for a relevant application program to process.

S403: packaging the processing result of the parsed packet data according to the local protocol corresponding to the matched version information to transmit to the external device.

In this embodiment, after the application program of the intelligent terminal device processes the parsed packet data, a processing result of the parsed packet data is generated. The intelligent terminal has to package the processing result of the parsed packet data according to a predetermined format and rule of the local protocol, and then it can ensure that the external device can parse the data returned by the intelligent terminal device.

In this embodiment, the intelligent terminal can successfully realize the reception, the transmission and the parsing of the service data transmitted by the external device, so as to realize the exchange of the service data between different devices.

Figure 5:
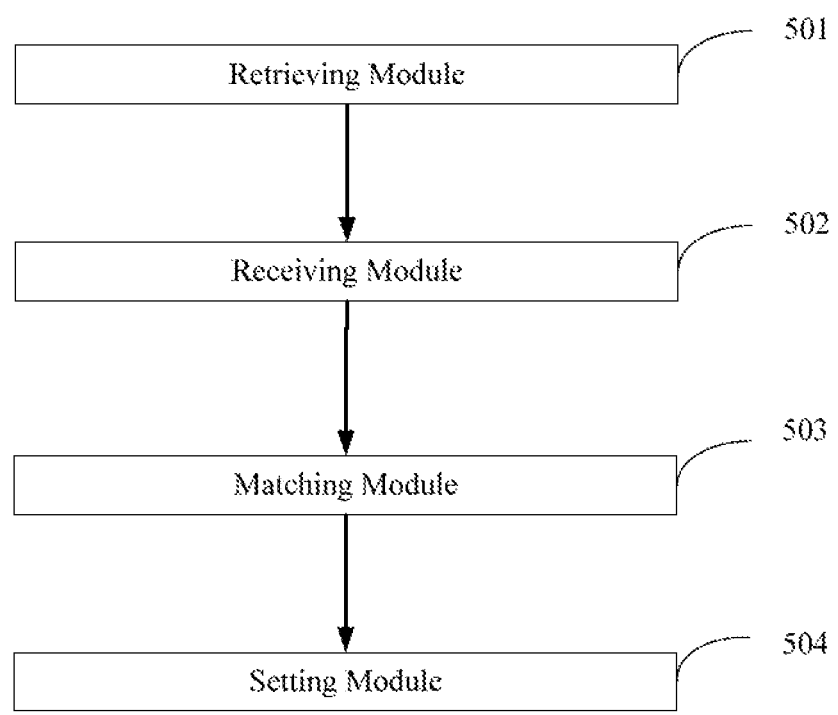
FIG. 5 is a block diagram of the structure of a communication protocol compatibility apparatus according to an embodiment of the present disclosure.

FIG. 5 is a block diagram of the structure of a communication protocol compatibility apparatus according to an embodiment of the present disclosure, which corresponds to the above-mentioned communication protocol compatibility method.

In the embodiment, the communication protocol compatibility apparatus is formed by plug-in modules. The plug-in modules facilitate the reduction of the coupling between modules, which reduce the complexity of the software and speed up the development of the communication protocol compatibility apparatus.

As shown in FIG. 5, the apparatus includes the following components:

a retrieving module 501 configured to retrieve a locally stored local protocol list, wherein the local protocol list includes a correspondence relationship between a local protocol and version information;

a receiving module 502 configured to receive a handshake instruction transmitted by an external device, wherein the handshake instruction includes an external protocol list, the external protocol list includes a correspondence relationship between an external protocol and version information;

a matching module 503 configured to take one of a same version information of the external protocol list and the local protocol list as matched version information, if the external protocol list and the local protocol list have the same (i.e., matched) version information; and a setting module 504 configured to take (i.e., set) the local protocol corresponding to the matched version information as the protocol for communicating with the external device, and transmitting the matched version information to the external device.

In this embodiment, the retrieving module 501 is configured to perform a function of retrieving a locally stored local protocol list; the receiving module 502 is configured to perform a communication function of performing data exchange with exteriors; and the matching module 503 is configured to perform a protocol matching function through a plug-in interface; the setting module 504 is configured to perform functions of the dynamic loading, the dynamic release and the switching of protocols. The apparatus includes a processor and a memory storing instructions executable for the processor, where the instructions functions as the retrieving module 501, the receiving module 502, the matching module 503, and the setting module 504.

Furthermore, the device further includes:

An obtaining module configured to obtain the version information of the latest protocol;

a determining module configured to determine whether an upgrade instruction is received, if the local protocol list does not include the version information of the latest protocol;

an updating module configured to download the latest protocol and adding the latest protocol into the local protocol list to update the local protocol list, if the upgrade instruction is received;

a searching module configured to select the version information to be searched from the local protocol list in the order from the latest version information to the oldest version information, and determine whether the version information to be searched is in the external protocol list via traversing the external protocol list; and a determining module configured to take the version information to be searched as the same version information of the external protocol list and the local protocol list, if the version information to be searched is in the external protocol list.

Furthermore, the setting module 504 is specifically configured to:

determine whether the version information corresponding to the currently loaded protocol is the matched version information;

release the currently loaded protocol and load the local protocol corresponding to the matched version information according to the correspondence relationship between the local protocol and the version information, if the version information corresponding to the currently loaded protocol is not the matched version information; and continue to use the currently loaded protocol to communicate with the external device, if the version information corresponding to the currently loaded protocol is the matched version information.

Furthermore, the device further includes:

a service receiving module configured to receive service data transmitted by the external device;

a parsing module configured to parse the service data according to the local protocol corresponding to the matched version information to generate parsed packet data; and a packaging module configured to package the parsed packet data according to the local protocol corresponding to the matched version information to transmit to the external device.

In this embodiment, retrieving a locally stored local protocol list and receiving an external protocol list transmitted by an external device; taking the latest one of a same version information of the external protocol list and the local protocol list as matched version information, if the external protocol list and the local protocol list have the same version information; and taking the local protocol corresponding to the matched version information as the protocol for communicating with the external device, and feeding back the matched version information to the external device. As a result, when the terminal device and the external device have the same communication protocol, they can perform data exchange using the same communication protocol automatically, which reduces the possibility of the incompatibility in the communication protocol so as to improve the communication success rate.

Figure 6:
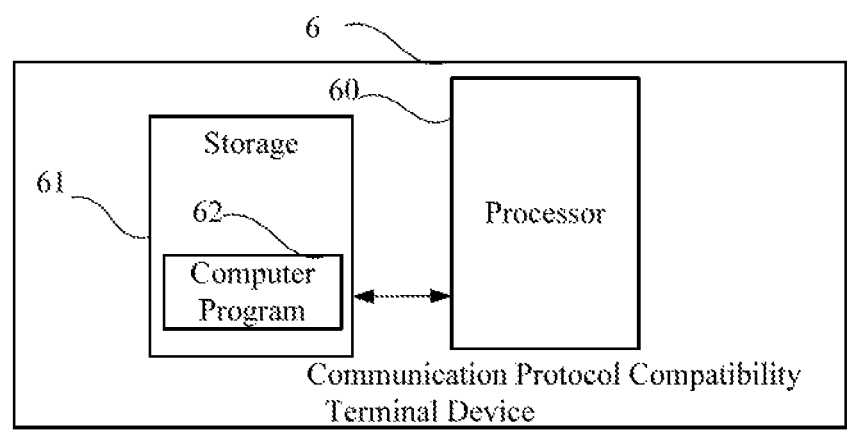
FIG. 6 is a block diagram of a communication protocol compatibility terminal device according to an embodiment of the present disclosure.

FIG. 6 is a block diagram of a communication protocol compatibility terminal device according to an embodiment of the present disclosure, which corresponds to the above-mentioned communication protocol compatibility method. As shown in FIG. 6, the communication protocol compatibility terminal device 6 includes a processor 60, a storage 61, and a computer program 62 stored in the storage 61 and executable on the processor 60 such as a user key encryption program. When the processor 60 executes the computer program 62, the steps such as S101-S106 shown in FIG. 1 which are in in the embodiment of the above-mentioned communication protocol compatibility method are realized. Alternatively, when the processor 60 executes the computer program 62, the functions of each module/unit in the above-mentioned apparatus embodiment, for example, the functions of the modules 501-504 shown in FIG. 5, are implemented. In this embodiment, the storage 61 is a memory.

The communication protocol compatibility terminal device 6 may be a computing device such as a desktop computer, a notebook, a palmtop, a cloud server, and an intelligent terminal device. The communication protocol compatibility terminal device 6 may include, but not limited to, the processor 60 and the storage 61. It can be understood by those skilled in the art that FIG. 6 is merely an example of the communication protocol compatibility terminal device 6, and does not form a limitation on the communication protocol compatibility terminal device 6, which may include more or fewer components than the FIG. 6 shows, or can combine some components or different components, for example, the communication protocol compatibility terminal device 6 may further include an input/output device, a network access device, a bus, and the like.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

Those skilled in the art may clearly understand that, for the convenience and simplicity of description, the division of the above-mentioned functional units and modules, is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present application. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure. It should be understood that the disclosed apparatus/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented method for communication protocol compatibility, comprising executing on a processor steps of:
   receiving a handshake instruction transmitted by an external device, wherein the handshake instruction comprises an external protocol list, the external protocol list comprises a correspondence relationship between an external protocol and version information of the external protocol;
   retrieving a locally stored local protocol list, wherein the local protocol list comprises a correspondence relationship between a local protocol and version information of the local protocol;

determining whether there is a same version information in the external protocol list and the local protocol list;

taking one of the same version information of the external protocol list and the local protocol list as matched version information, if the external protocol list and the local protocol list have the same version information;

taking the local protocol corresponding to the matched version information as the protocol for communicating with the external device, and transmitting the matched version information to the external device; and transmitting a service protocol mismatch response to the external device, if there is no the same version information in the external protocol list and the local protocol list, wherein the service protocol mismatch response is used to notify the external device that related service data cannot be received, transmitted or parsed.

2. The method of claim 1, wherein before the step of receiving the handshake instruction transmitted by the external device further comprises:

obtaining version information of the latest protocol;

determining whether an upgrade instruction is received, if the local protocol list does not comprise the version information of the latest protocol; and downloading the latest protocol and adding the latest protocol into the local protocol list to update the local protocol list, if the upgrade instruction is received.

3. The method of claim 2, wherein the step of determining whether the upgrade instruction is received, if the local protocol list does not comprise the version information of the latest protocol comprises:

determining whether the upgrade instruction is received according to a selection of an user which is to upgrade the local protocol, if the local protocol list does not comprise the version information of the latest protocol; and determining that the upgrade instruction is received, if the selection of the user which is to upgrade the local protocol is detected;

or, the step of determining whether the upgrade instruction is received, if the local protocol list does not comprise the version information of the latest protocol comprises:

determining whether the upgrade instruction is received basing on whether a time difference of a current time and a last upgrade time is greater than a preset time threshold;

determining that the upgrade instruction is received, if the time difference between the current time and the last upgrade time is greater than the preset time threshold.

4. The method of claim 1, wherein the step of determining whether there is the same version information in the external protocol list and the local protocol list comprises:

selecting the version information to be searched from the local protocol list in the order from the latest version information to the oldest version information, and determining whether the version information to be searched is in the external protocol list via traversing the external protocol list; and taking the version information to be searched as the same version information of the external protocol list and the local protocol list, if the version information to be searched is in the external protocol list.

5. The method of claim 1, wherein the step of the taking one of the same version information of the external protocol list and the local protocol list as the matched version information comprises:

taking the latest one of the same version information of the external protocol list and the local protocol list as the matched version information.

6. The method of claim 1, wherein the step of taking the local protocol corresponding to the matched version information as the protocol for communicating with the external device comprises:

determining whether the version information corresponding to the currently loaded protocol is the matched version information;

releasing the currently loaded protocol and loading the local protocol corresponding to the matched version information according to the correspondence relationship between the local protocol and the version information of the local protocol, if the version information of the local protocol corresponding to the currently loaded protocol is not the matched version information; and continuing to use the currently loaded protocol to communicate with the external device, if the version information corresponding to the currently loaded protocol is the matched version information.

7. The method of claim 1, further comprises:

receiving service data transmitted by the external device;

parsing the service data according to the local protocol corresponding to the matched version information to generate parsed packet data; and packaging the parsed packet data according to the local protocol corresponding to the matched version information to transmit to the external device.

8. The method of claim 1, wherein the external protocol and the local protocol do not include underlying protocols common to all communication devices.

9. An apparatus for communication protocol compatibility comprising a processor and a memory, wherein the processor is electronically coupled to the memory and an external device, the memory stores instructions that are executable by the processor, and the instructions comprise:

a receiving module configured to receive a handshake instruction transmitted by the external device, wherein the handshake instruction comprises an external protocol list, the external protocol list comprises a correspondence relationship between an external protocol and version information of the external protocol;

a retrieving module configured to retrieve a locally stored local protocol list, wherein the local protocol list comprises a correspondence relationship between a local protocol and version information of the local protocol, and determine whether there is a same version information in the external protocol list and the local protocol list;

a matching module configured to take one of a same version information of the external protocol list and the local protocol list as matched version information, if the external protocol list and the local protocol list have the same version information; and a setting module configured to take the local protocol corresponding to the matched version information as the protocol for communicating with the external device, and transmitting the matched version information to the external device;

wherein a service protocol mismatch response is transmitted to the external device, if there is no the same version information in the external protocol list and the local protocol list, and wherein the service protocol mismatch response is used to notify the external device that related service data cannot be received, transmitted or parsed.

10. The apparatus of claim 9, wherein the instructions further comprise:
an obtaining module configured to obtain the version information of the latest protocol;
a determining module configured to determine whether an upgrade instruction is received, if the local protocol list does not comprise the version information of the latest protocol; and
an updating module configured to download the latest protocol and adding the latest protocol into the local protocol list to update the local protocol list, if the upgrade instruction is received.

11. The apparatus of claim 9, wherein the retrieving module further configured to:
select the version information to be searched from the local protocol list in the order from the latest version information to the oldest version information, and determine whether the version information to be searched is in the external protocol list via traversing the external protocol list; and
take the version information to be searched as the same version information of the external protocol list and the local protocol list, if the version information to be searched is in the external protocol list.

12. The apparatus of claim 9, wherein the matching module is configured to take the latest one of the same version information of the external protocol list and the local protocol list as the matched version information.

13. The apparatus of claim 9, wherein the setting module is configured to:
determine whether the version information corresponding to the currently loaded protocol is the matched version information;
release the currently loaded protocol and load the local protocol corresponding to the matched version information according to the correspondence relationship between the local protocol and the version information of the local protocol, if the version information of the local protocol corresponding to the currently loaded protocol is not the matched version information; and
continue to use the currently loaded protocol to communicate with the external device, if the version information corresponding to the currently loaded protocol is the matched version information.

14. The apparatus of claim 9, wherein the instructions further comprise:
a service receiving module configured to receive service data transmitted by the external device;
a parsing module configured to parse the service data according to the local protocol corresponding to the matched version information to generate parsed packet data; and
a packaging module configured to package the parsed packet data according to the local protocol corresponding to the matched version information to transmit to the external device.

15. A terminal device for communication protocol compatibility, comprising:
one or more processors;
a memory; and
one or more programs, wherein the one or more programs are stored in the memory and configured to be executed by the one or more processors, the one or more programs comprises:
instructions for receiving a handshake instruction transmitted by an external device, wherein the handshake instruction comprises an external protocol list, the external protocol list comprises a correspondence relationship between an external protocol and version information of the external protocol;
instructions for retrieving a locally stored local protocol list, wherein the local protocol list comprising a correspondence relationship between a local protocol and version information of the local protocol;
instructions for determining whether there is a same version information in the external protocol list and the local protocol list;
instructions for taking one of the same version information of the external protocol list and the local protocol list as matched version information, if the external protocol list and the local protocol list have the same version information;
instructions for taking the local protocol corresponding to the matched version information as the protocol for communicating with the external device, and transmitting the matched version information to the external device; and
instructions for transmitting a service protocol mismatch response to the external device, if there is no the same version information in the external protocol list and the local protocol list, wherein the service protocol mismatch response is used to notify the external device that related service data cannot be received, transmitted or parsed.

16. The terminal device of claim 15, wherein the one or more programs further comprises:
instructions for obtaining the version information of the latest protocol;
instructions for determining whether an upgrade instruction is received, if the local protocol list does not comprise the version information of the latest protocol; and
instructions for downloading the latest protocol and adding the latest protocol into the local protocol list to update the local protocol list, if the upgrade instruction is received.

17. The terminal device of claim 15, wherein the one or more programs further comprises:
instructions for selecting the version information to be searched from the local protocol list in the order from the latest version information to the oldest version information, and determining whether the version information to be searched is in the external protocol list via traversing the external protocol list; and
instructions for taking the version information to be searched as the same version information of the external protocol list and the local protocol list, if the version information to be searched is in the external protocol list.

18. The terminal device of claim 15, wherein the instructions for taking one of the same version information of the external protocol list and the local protocol list as the matched version information comprises:
instructions for taking the latest one of the same version information of the external protocol list and the local protocol list as the matched version information.

19. The terminal device of claim 15, wherein the instructions for taking the local protocol corresponding to the matched version information as the protocol for communicating with the external device comprises:

instructions for determining whether the version information corresponding to the currently loaded protocol is the matched version information;

instructions for releasing the currently loaded protocol and loading the local protocol corresponding to the matched version information according to the correspondence relationship between the local protocol and the version information of the local protocol, if the version information of the local protocol corresponding to the currently loaded protocol is not the matched version information; and instructions for continuing to use the currently loaded protocol to communicate with the external device, if the version information corresponding to the currently loaded protocol is the matched version information.

20. The terminal device of claim 15, wherein the one or more programs further comprises:

instructions for receiving service data transmitted by the external device;

instructions for parsing the service data according to the local protocol corresponding to the matched version information to generate parsed packet data; and instructions for packaging the parsed packet data according to the local protocol corresponding to the matched version information to transmit to the external device.

* * * * *